(12) United States Patent
Kwon et al.

(10) Patent No.: US 11,365,318 B2
(45) Date of Patent: Jun. 21, 2022

(54) ANTI-STRIPPING AGENT FOR ASPHALT MIXTURE INCLUDING REFINED SLOWLY-COOLED SLAG, METHOD FOR PREPARING THE SAME, ASPHALT MIXTURE INCLUDING THE SAME AND METHOD FOR PREPARING THE SAME

(71) Applicants: KOREA INSTITUTE of CIVIL ENGINEERING and BUILDING TECHNOLOGY, Gyeonggi-do (KR); SP Nature Co. Ltd, Chungcheongnam-do (KR)

(72) Inventors: Soo Ahn Kwon, Gyeonggi-do (KR); Moon Sup Lee, Gyeonggi-do (KR); Kang Hun Lee, Incheon (KR); Jeong Tan Son, Gyeonggi-do (KR); Young Nam Han, Gyeonggi-do (KR); Dong Ho Ha, Gyeongsangbuk-do (KR); Byoung In Jang, Chungcheongbuk-do (KR); Jin Hyoung Lee, Gyeonggi-do (KR)

(73) Assignees: KOREA INSTITUTE of CIVIL ENGINEERING and BUILDING TECHNOLOGY, Gyeonggi-do (KR); SP Nature Co. Ltd, Chungcheongnam-do (KR)

( * ) Notice: Subject to any disclaimer, the term of this patent is extended or adjusted under 35 U.S.C. 154(b) by 330 days.

(21) Appl. No.: 16/209,628

(22) Filed: Dec. 4, 2018

(65) Prior Publication Data
US 2020/0017687 A1 Jan. 16, 2020

(30) Foreign Application Priority Data
Jul. 13, 2018 (KR) .................. KR10-2018-0081551

(51) Int. Cl.
*C08L 95/00* (2006.01)
*C08K 3/22* (2006.01)
(Continued)

(52) U.S. Cl.
CPC .......... *C08L 95/005* (2013.01); *C04B 18/142* (2013.01); *C04B 26/26* (2013.01);
(Continued)

(58) Field of Classification Search
CPC .. C08L 95/00; C08L 2555/28; C08L 2555/52; C08L 2555/34; C08L 2555/20;
(Continued)

(56) References Cited

U.S. PATENT DOCUMENTS 7,309,390 B2 * 12/2007 Falkiewicz ............. C08L 95/00
106/284.1
2007/0084306 A1 * 4/2007 Jones ...................... C21C 7/076
75/316
(Continued)

FOREIGN PATENT DOCUMENTS

| JP | 2008-261038 A | 10/2008 |
|---|---|---|
| JP | 2013-237605 A | 11/2013 |

(Continued)

OTHER PUBLICATIONS

Lee, K. et al., Evaluation of Moisture Resistance of Hot-Mix Asphalt Mixture Containing Refined Air-Colled Slag for Road Pavements, The Third International Conference on Applied Engineering, Materials and Mechanics, 2018, (3rd ICAEMM 2018), Apr. 20, 2018, Reference Nos. 1-1, 1-2, Okinawa, Japan.
(Continued)

*Primary Examiner* — Alexandra M Moore
(74) *Attorney, Agent, or Firm* — IP & T Group LLP

(57) ABSTRACT

The present technology relates to an anti-stripping agent for an asphalt mixture, which includes a refined slowly-cooled
(Continued)

US 11,365,318 B2
Page 2 slag obtained by processing slag, generated in ironmaking and steelmaking processes, using a specific method, and to a method for preparing the same, an asphalt mixture including the same, and a method for preparing the asphalt mixture. The refined slowly-cooled slag may include 55 to 65 mass % of CaO, 5 to 10 mass % of $SiO_2$, 1 to 5 mass % of $Al_2O_3$, and 1 to 5 mass % of MgO.

7 Claims, 17 Drawing Sheets

(51) Int. Cl.
*C08K 3/36* (2006.01)
*C04B 18/14* (2006.01)
*C04B 26/26* (2006.01)
*C08K 3/08* (2006.01)
*E01C 7/26* (2006.01)
*C04B 111/00* (2006.01)

(52) U.S. Cl.
CPC .................. *C08K 3/22* (2013.01); *C08K 3/36* (2013.01); *C04B 2111/0075* (2013.01); *C08K 2003/0856* (2013.01); *C08L 2666/74* (2013.01); *E01C 7/26* (2013.01)

(58) Field of Classification Search
CPC ....... C08L 2666/74; C08K 3/22; C08K 5/092; C04B 18/141; C04B 18/142
See application file for complete search history.

(56) References Cited

U.S. PATENT DOCUMENTS

| | | | |
|---|---|---|---|
| 2011/0196073 A1* | 8/2011 | Fee ......................... | C08L 95/00 524/68 |
| 2013/0180431 A1* | 7/2013 | Myszak, Jr. ............ | C04B 28/26 106/283 |

FOREIGN PATENT DOCUMENTS

| | | | |
|---|---|---|---|
| JP | 2017007880 | 1/2017 | |
| KR | 100795184 | 1/2008 | |
| KR | 1020120091781 | 8/2012 | |
| KR | 101386171 | 4/2014 | |
| KR | 1020170075419 | 7/2017 | |
| KR | 1020170126711 | 11/2017 | |
| KR | 1020180024633 | 3/2018 | |
| WO | WO-9105019 A1 * | 4/1991 | .............. C08L 95/00 |
| WO | 2017021854 A1 | 2/2017 | |

OTHER PUBLICATIONS

Running exhibition promotional booths: 2018 ICRE (International Conference For Road Engineers), May 29, 2018, Reference Nos. 2-1, 2-2,2-3, 2-4, Jeju Island, Korea.
Office action issued by the Japan Patent Office dated Feb. 4, 2020.

* cited by examiner

ANTI-STRIPPING AGENT FOR ASPHALT MIXTURE INCLUDING REFINED SLOWLY-COOLED SLAG, METHOD FOR PREPARING THE SAME, ASPHALT MIXTURE INCLUDING THE SAME AND METHOD FOR PREPARING THE SAME

CROSS-REFERENCE TO RELATED APPLICATION

This patent document claims priority of Korean Patent Application No. 10-2018-0081551, entitled "ANTI-STRIPPING AGENET FOR ASPHALT MIXTURE USING PURIFIED SLOWLY COOLED SLAG, METHOD FOR MANUFACTURING THE SAME, ASPHALT MIXTURE INCLUDING THE SAME AND METHOD FOR MANUFACTURING THE SAME" and filed on Jul. 13, 2018, which is incorporated herein by reference in its entirety.

BACKGROUND

1. Technical Field

The present disclosure relates to an anti-stripping agent for an asphalt mixture, and more particularly to an anti-stripping agent for an asphalt mixture, which includes a refined slowly-cooled slag obtained by processing slag, generated in ironmaking and steelmaking processes, using a specific method, and thus can exhibit the effects of improving the water resistance of the asphalt mixture, reducing the aging and rutting of asphalt and improving the crack resistance of asphalt, and at the same time, can increase economy and process efficiency by recycling the by-product, and to a method for preparing the same, an asphalt mixture including the same, and a method for preparing the asphalt mixture.

2. Related Art

In South Korea, due to a surge in freight volume since 1990s, increased vehicle weight and size, atmospheric environmental changes such as abnormal high temperatures and heavy rains, and the like, various forms of damage to asphalt pavement roads have rapidly increased, including rutting, cracking, portholes, and the like. This causes traffic accidents and also incurs enormous costs for maintenance and repair. In addition, the use of improper pavement materials, inadequate quality control systems, and the like further accelerate premature damage to asphalt pavements, resulting in a significant decrease in pavement life.

Given this situation, the Korean Ministry of Land, Infrastructure and Transport has defined quality standards for improving the water resistance of asphalt mixtures in order to reduce water-induced asphalt pavement damages such as portholes. According to the Guidelines for Asphalt Concrete Pavement Construction set by the Korean Ministry of Land, Infrastructure and Transport, criteria for indirect tensile strength ratio and criteria for dynamic immersion tests were added in order to evaluate the water resistance of asphalt mixtures, and it is required that if the indirect tensile strength ratio and dynamic immersion test results do not meet the criteria, hydrated lime or a liquid anti-stripping agent should be used. Accordingly, in the asphalt pavement industry, hydrated lime has been used in an amount of 1 to 1.5 wt % based on the weight of an asphalt mixture in order to improve the water resistance of general hot-mixed asphalt concrete, and some liquid anti-stripping agents developed or imported have been used. Hydrated lime precipitates a calcium ion on the aggregate surface, and the calcium ion binds to an acid contained in an asphalt binder to form an insoluble salt. The formed insoluble salt improves the adhesion between the asphalt and the aggregate. However, hydrated lime or a liquid anti-stripping agent, which is used in the asphalt industry, requires a separately constructed facility and is highly costly, and thus the use thereof may be limited. In addition, for economic reasons, it is not easy to apply for general purposes in the pavement industry, and thus actual construction results obtained using it are insignificant. Accordingly, there is still a need to develop an anti-stripping agent which can improve the water resistance of asphalt mixture and, at the same time, is more efficient in economic terms and can be widely applied.

Meanwhile, ironmaking and steelmaking processes use connected production systems for complex processes, including raw material, iron making, steel making, rolling and stainless processes, etc., and inevitably generate various kinds of by-products and waste due to the characteristics of the making processes. Among these by-products, the most abundant by-product is iron and steel slag obtained by separation from molten metal after iron ore, bituminous coal, limestone and the like, used as raw materials for producing iron, are melted at high temperatures. Iron and steel slag can be classified into two types: blast furnace slag generated together with molten metal (pig iron) after iron ore, bituminous coal, limestone and the like, introduced into a blast furnace for iron production, are melted at 1500° C. or higher; and steelmaking slag generated in steelmaking processes. Blast furnace slag can be classified, according to cooling methods, into granulated slag and air-cooled slag, and steelmaking slag can be classified, according to the type of steelmaking process equipment, into basic oxygen furnace slag and electric arc furnace slag.

In the iron and steel industry, the effect of energy prices along with raw material prices on production costs is very large, and thus countries around the world have made efforts have made efforts for rational energy management in the iron and steel industry. As one of such efforts, researches on the technology of recycling iron and steel slag to recover the energy discharged from various processes have been actively conducted. Iron and steel slag is a useful environmentally friendly material produced by melting at high temperatures, can replace natural resources, and can have high utility in terms of energy saving and environmental hazard reduction.

Korean Patent No. 10-0795184 (Patent Document 1) disclose technology related to an aggregate for asphalt concrete, which includes an electric arc furnace oxidized slag obtained by crushing and grinding an electric arc furnace containing 19.0-31.1 wt % of $SiO_2$, 29.6-38.2 wt % of $Fe_2O_3$, 7.0-13.9 wt % of $Al_2O_3$, 14.5-38.0 wt % of CaO, 6.0-8.1 wt % MgO, and 0.14-0.28 wt % $K_2O$, and removing the iron component ($Fe_2O_3$) from the ground slag, and then separating the ground slag according to size, and to an asphalt concrete including the same. Although the technology disclosed in Patent Document 1 above relates to the recycling of slag, it is used as an aggregate for asphalt concrete and is not effective as an anti-stripping agent for improving the water resistance of asphalt mixtures.

PRIOR ART DOCUMENTS

Patent Documents

Patent Document 1: Korean Patent No. 10-0795184 (Jan. 16, 2008).

SUMMARY

Various embodiments are directed to an anti-stripping agent for an asphalt mixture, which includes a refined slowly-cooled slag obtained by processing slag, generated in ironmaking and steelmaking processes, using a specific method, and thus can replace conventional anti-stripping agents by improving the water resistance of the asphalt mixture, and at the same time, can increase economy and process efficiency by recycling the by-product, and to a method for preparing the same, an asphalt mixture including the same, and a method for preparing the asphalt mixture.

In one embodiment, an anti-stripping agent for an asphalt mixture may include a refined slowly-cooled slag. The refined slowly-cooled slag may include 55 to 65 mass % of CaO, 5 to 10 mass % of $SiO_2$, 1 to 5 mass % of $Al_2O_3$, and 1 to 5 mass % of MgO.

Embodiments of the above anti-stripping agent may include one or more the followings.

The refined slowly-cooled slag may further comprise one or more selected from the group consisting of MnO, Na2O, K2O, P2O5 and TiO2. The anti-stripping agent may be in powder form. The refined slowly-cooled slag may be obtained by processing iron and steel slag so as to increase the collection and recovery of a nonferrous material comprising CaO, SiO2, Al2O3 and MgO. The anti-stripping agent may satisfy conditions specified in KS F 3501. The refined slowly-cooled slag may precipitate a calcium ion on a surface of aggregate in the asphalt mixture, and the precipitated calcium ion may bind to an acid contained in asphalt to form an insoluble salt, thereby improving adhesion between the asphalt and the aggregate.

In another embodiment, a method for preparing an anti-stripping agent for an asphalt mixture including a refined slowly-cooled slag may include: (a) sizing iron and steel slag, and collecting slag equal to or smaller than a reference diameter; (b) collecting a non-attached material remaining after separating a ferrous material from the slag collected in a); (c) performing a process of increasing the collection and recovery of nonferrous material, including CaO, $SiO_2$, $Al_2O_3$ and MgO, on the non-attached material collected in (b); and (d) drying a material resulting from (c), wherein the refined slowly-cooled slag may include 55 to 65 mass % of CaO, 5 to 10 mass % of $SiO_2$, 1 to 5 mass % of $Al_2O_3$, and 1 to 5 mass % of MgO.

Embodiments of the above method may include one or more the followings.

Step (c) may comprise performing a water coating process on the non-attached material collected in (b). The water coating process may comprise supplying tap water or purified water at a rate of 3 to 5 kg per minute through a spray nozzle. Step (a) may comprise: (1) sizing iron and steel slag, and collecting slag equal to or smaller than a first reference diameter; (2) sizing the slag collected in (1), and collecting slag equal to or smaller than a second reference diameter which is smaller than the first reference diameter, and collecting a non-attached material remaining after separating a ferrous material from slag larger than the second reference diameter; (3) performing a crushing process on the non-attached material collected in (2), and collecting slag equal to or smaller than the second reference diameter; and (4) gathering the slag equal to or smaller than the second reference diameter, collected in (2), and the slag equal to or smaller than the second reference diameter, collected in (3). The separating of the ferrous material in (2) may be performed by magnetic selection. The separating of the ferrous material in (b) may be performed by magnetic selection and air classification. The drying in (d) may be performed to a water content of 2 wt % or less. The method may further comprise, after (d): collecting the dried material by a collection system; and performing a quality equalization process on the collected material. The quality equalization process may comprise adjusting water content to 1 wt % or less and making water distribution uniform, by use of an air slide.

In still another embodiment, an asphalt mixture may include: an anti-stripping agent for an asphalt mixture according to the above-described embodiment; aggregate; and asphalt.

Embodiments of the above asphalt mixture may include one or more the followings.

A weight ratio between the asphalt and the aggregate may be in the range of 3.5:96.5 to 6.0:94.0.

In yet another embodiment, a method for preparing an asphalt mixture may include: preparing an anti-stripping agent for an asphalt mixture according to the above-described embodiment; adding the anti-stripping agent for the asphalt mixture to heated asphalt, followed by uniform mixing to obtain a mixture; and adding the mixture to heated aggregate, followed by mixing.

The anti-stripping agent may be added in an amount of 0.5 to 6.0 wt % based on the weight of the aggregate. A weight ratio between the asphalt and the aggregate may be in the range of 3.5:96.5 to 6.0:94.0.

DETAILED DESCRIPTION

Figure 1A:
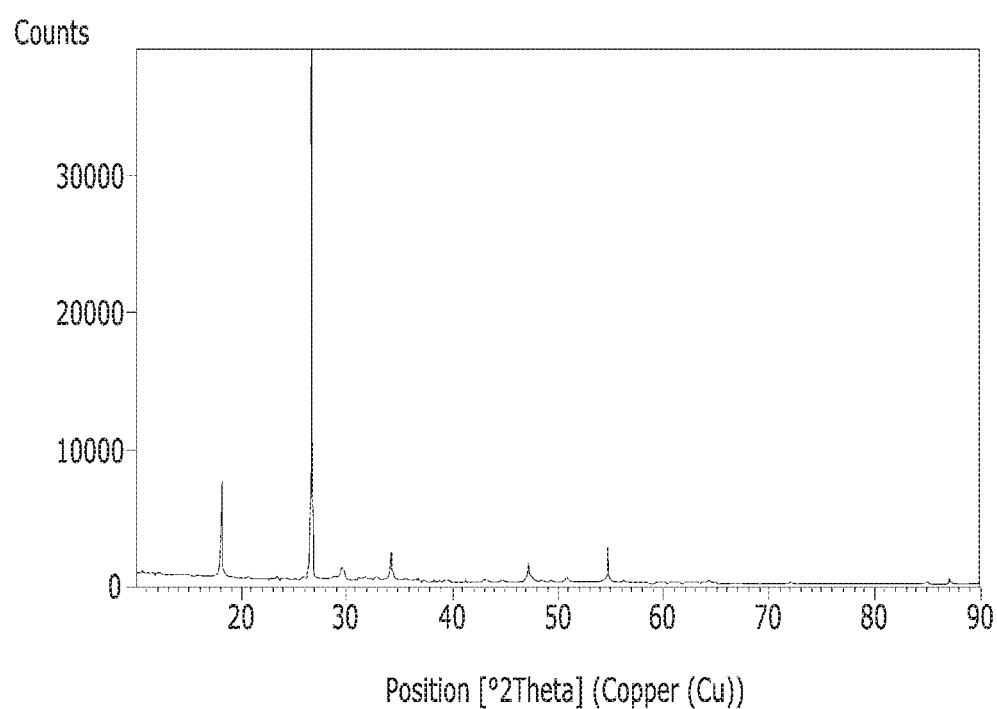
FIGS. 1A and 1B, respectively, show the XRD analysis pattern and pattern list of an anti-stripping agent including a refined slowly-cooled slag according to an example, and FIGS. 1C and 1D, respectively, show the XRD analysis pattern and pattern list of hydrated lime.

Hereinafter, exemplary embodiments of the present disclosure will be described in detail, so that those skilled in the art to which the present disclosure pertains can easily understand the technical idea of the present disclosure. In the following description, many specific details such as specific components are given to provide more thorough understanding of the present disclosure. However, it will be obvious to those skilled in the art that the present disclosure can be implemented without such specific details. In the following description, the detailed description of known functions or configurations will be omitted when it may unnecessarily obscure the subject matter of the present disclosure.

One embodiment of the present disclosure is directed to an anti-stripping agent for an asphalt mixture, which includes a refined slowly-cooled slag.

The refined slowly-cooled slag that is used in the present disclosure may be obtained by processing iron and steel slag using a specific method. The iron and steel slag that is used as a raw material may include steelmaking slag. The refined slowly-cooled slag of the present disclosure may be obtained by processing iron and steel slag so as to increase the collection and recovery of nonferrous materials, including particularly $CaO$, $SiO_2$, $Al_2O_3$ and $MgO$, in order to improve the physical properties (particularly water resistance) of the asphalt mixture. The refined slowly-cooled slag that is used in the present disclosure includes a composition including $CaO$, $SiO_2$, $Al_2O_3$ and $MgO$, adapted by this processing, and thus can exhibit the property of improving the water resistance of the asphalt mixture by reducing the stripping of asphalt from aggregate.

The refined slowly-cooled slag that is used in the present disclosure may include 55 to 65 mass % of $CaO$, 5 to 10 mass % of $SiO_2$, 1 to 5 mass % of $Al_2O_3$ and 1 to 5 mass % of $MgO$. Among the components included in the refined slowly-cooled slag, particularly $CaO$, $SiO_2$, $Al_2O_3$ and $MgO$ may play a major role in improving the water resistance of the asphalt mixture. In the present disclosure, the anti-stripping effect may be maximized by optimizing the contents of these components.

In one embodiment, the refined slowly-cooled slag that is included in the anti-stripping agent for the asphalt mixture according to the present disclosure may further include one or more selected from the group consisting of $MnO$, $Na_2O$, $K_2O$, $P_2O_5$ and $TiO_2$.

In one embodiment, the refined slowly-cooled slag that is included in the anti-stripping agent for the asphalt mixture according to the present disclosure may further include 0.01 to 0.5 mass % of $MnO$.

In one embodiment, the refined slowly-cooled slag that is included in the anti-stripping agent for the asphalt mixture according to the present disclosure may further include 0.001 to 0.5 mass % of $Na_2O$.

In one embodiment, the refined slowly-cooled slag that is included in the anti-stripping agent for the asphalt mixture according to the present disclosure may further include 0.001 to 0.5 mass % of $K_2O$.

In one embodiment, the refined slowly-cooled slag that is included in the anti-stripping agent for the asphalt mixture according to the present disclosure may further include 0.001 to 0.5 mass % of $P_2O_5$.

In one embodiment, the refined slowly-cooled slag that is included in the anti-stripping agent for the asphalt mixture according to the present disclosure may further include 0.001 to 0.5 mass % of $TiO_2$.

The rest of the refined slowly-cooled slag, excluding the above-described components, may include trace components and water.

The refined slowly-cooled slag that is used in the present disclosure may be formed to have a specific composition that exhibits physical properties (including water resistance) required for the asphalt mixture. This specific composition may be obtained by a specific process that includes processing iron and steel slag so as to increase the collection and recovery of nonferrous materials, including $CaO$, $SiO_2$, $Al_2O_3$ and $MgO$. This specific process will be described in more detail in the examples described below with respect to a method for preparing an anti-stripping agent for an asphalt mixture.

The refined slowly-cooled slag of the present disclosure, which has this specific composition, shows an XRD analysis pattern similar to that of hydrated lime, indicating that it can precipitate a calcium ion on the aggregate surface of the asphalt mixture, in which the calcium ion can bind to an acid contained in the asphalt to form an insoluble salt, thereby improving the adhesion between the asphalt and the aggregate. In addition, it has the effect of reducing the aging of the asphalt binder by reducing the oxidation thereof. In addition, it can reduce the rutting of asphalt by increasing the stiffness of the asphalt. It also provides effective crack resistance, and thus can reduce the progression of microcracks.

Meanwhile, hydrated lime or a liquid anti-stripping agent, which has been known as an anti-stripping agent, requires a separately constructed facility and is highly costly, and thus the use thereof is limited, and actual construction results obtained using it are insignificant. Unlike the hydrated lime or liquid anti-stripping agent, the refined slowly-cooled slag that is used in the present disclosure is obtained by recycling slag generated as a by-product in steelmaking processes, and thus exhibits high economy and environmental friendliness and may be widely applied in actual industrial fields. Further, the refined slowly-cooled slag that is used in the present disclosure does not require separately constructed facility and can be continuously added to the asphalt mixture.

In accordance with one embodiment of the present disclosure, the anti-stripping agent for the asphalt mixture may be in powder form.

In accordance with one embodiment of the present disclosure, the anti-stripping agent for the asphalt mixture may meet the conditions defined in KS F 3501 related to fillers for asphalt pavement.

Another embodiment of the present disclosure is directed to a method for preparing an anti-stripping agent for an asphalt mixture including a refined slowly-cooled slag. The method may include: (a) sizing iron and steel slag, and collecting slag equal to or smaller than a reference diameter; (b) collecting a non-attached material remaining after separating a ferrous material from the slag collected in (a); (c) performing a process of increasing the collection and recovery of nonferrous material, including $CaO$, $SiO_2$, $Al_2O_3$ and $MgO$, on the non-attached material collected in (b); and (d) drying a material resulting from (c). Each step of the method will be described in detail below. Since the anti-stripping agent for the asphalt mixture has been described in detail above with respect to the embodiments, the detailed description thereof is omitted in this embodiment in order to avoid repeated description.

First, in step (a), iron and steel slag may be sized, and slag equal to or smaller than a reference diameter may be collected.

In one embodiment, step (a) may include the following steps 1 to 4:

step 1: a step of sizing iron and steel slag and collecting slag equal to or smaller than a first reference diameter;

step 2: a step of sizing the slag collected in step 1, and collecting slag equal to or smaller than a second reference diameter which is smaller than the first reference diameter, and collecting a non-attached material remaining after separating a ferrous material from slag larger than the second reference diameter;

step 3: a step of performing a crushing process on the non-attached material collected in step 2, and collecting slag equal to or smaller than the second reference diameter;

step 4: a step of gathering the slag equal to or smaller than the second reference diameter, collected in step 2, and the slag equal to or smaller than the second reference diameter, collected in step 3.

In one embodiment, the first reference diameter may be in the range of 200 to 500 mm, and the second reference diameter may be in the range of 20 to 70 mm.

In one embodiment, the separation of the ferrous material in step 2 may be performed by magnetic separation.

Next, in step (b), a non-attached material remaining after separating the ferrous material from the slag collected in step (a) may be collected.

In one embodiment, the separation of the ferrous material in step (b) may be performed by magnetic separation and air classification.

Next, in step (c), a process of increasing the collection and recovery of a nonferrous material that includes $CaO$, $SiO_2$, $Al_2O_3$ and $MgO$ may be performed on the non-attached material collected in step (b).

Since components, including $CaO$, $SiO_2$, $Al_2O_3$ and $MgO$, may play a major role in sufficiently exhibiting physical properties (particularly water resistance) required for the anti-stripping agent for the asphalt mixture, the recovery of these components may be increased during the preparation process so as to provide a specific composition. In the method for preparing the anti-stripping agent for the asphalt mixture according to the present disclosure, this process of increasing the collection and recovery of the non-ferrous material is performed, whereby the iron and steel slag can be refined so that nonferrous active components, including $CaO$, $SiO_2$, $Al_2O_3$ and $MgO$, can be enriched. As a result, the finally prepared anti-stripping agent may have a specific composition that exhibits suitable physical properties (particularly water resistance) required for the asphalt mixture.

In one embodiment, step (c) may include performing a water coating process on the non-attached material collected in step (b). This water coating process may be performed by supplying tap water or purified water at a rate of 3-5 kg per minute through a spray nozzle. For example, the water coating process may be performed using a spray nozzle installed in a hopper before introduction into a kiln in which drying of step (d) is performed.

When the water coating process on the non-attached material collected in step (b) is performed before the drying step as described above, nonferrous components, including $CaO$, $SiO_2$, $Al_2O_3$ and $MgO$, which have lower specific gravities than ferrous components, can be easily evaporated and scattered in the subsequent drying step, and thus the recovery of these nonferrous components by a collection system can be maximized.

Next, in step (d), the material resulting from step (c) may be dried.

In one embodiment, the drying may be performed to a water content of 2 wt % or less, preferably 1 wt % or less.

In one embodiment, the drying may be performed by introducing the material resulting from step (c) into a kiln and drying the introduced material, and the drying temperature may be lower than 350° C.

Next, the dried material may be collected by a collection system. As described above, when water coating and drying are performed in previous steps, nonferrous components, including $CaO$, $SiO_2$, $Al_2O_3$ and $MgO$, are introduced into a collection system in a state in which the evaporation and scattering of these nonferrous components has become easy. Thus, these nonferrous components can be collected and recovered at a maximized rate.

Next, a quality equalization process may be performed.

In some cases, despite the drying process in step (d), the water content may be about 2 wt % or less, and the water distribution may be non-uniform. For this reason, the quality equalization process may be performed to adjust the water content to 1 wt % or less, preferably to the range of 0.4 to 0.6 wt %, and to make the water distribution uniform throughout the resulting material.

In one embodiment, the quality equalization process may be performed using an air slide. The air slide, a kind of device for transferring and supplying powder, uses the principle according to which when a powder layer is fluidized by blowing air, the particles are very easy to flow, like a fluid. It is inclined with respect to the horizontal along a trough partitioned into upper and lower parts by a canvas or a porous plate, and powder supplied to the upper part of the trough is fluidized by air along the porous plate and flows down on the plate by gravity. In this procedure, the water content can be made uniform and reduced, and thus the finally collected powdery anti-stripping agent for the asphalt mixture may have uniform quality. Namely, it may have a water content of 1 wt % or less, uniformly distributed throughout it.

Another embodiment of the present disclosure is directed to an asphalt mixture. The asphalt mixture may include an anti-stripping agent for an asphalt mixture according to the above-described embodiment, aggregate, and asphalt. As the asphalt, any asphalt that is generally used for road pavement may be used. Asphalt can be generally classified according to the results of the penetration index test in accordance with ASTM D946. Representative asphalt for road pavement, currently produced in South Korea, is graded as 85-100 penetration asphalt (AP-3) and 60-70 penetration asphalt (AP-5).

In one embodiment, the anti-stripping agent for the asphalt mixture may be contained in an amount of 0.5 to 6.0 wt %, preferably 1.0 to 3.0 wt %, based on the weight of the aggregate. If the content of the anti-stripping agent for the asphalt mixture is less than 0.5 wt %, the adhesion between the asphalt and the aggregate cannot be sufficiently ensured, and thus the water resistance of the asphalt mixture can be reduced, and if the content of the anti-stripping agent for the asphalt mixture is more than 6.0 wt %, other physical properties of the asphalt mixture can be deteriorated.

In one embodiment, the weight ratio between the asphalt and the aggregate may be in the range of 3.5:96.5 to 6.0:94.0.

Because the asphalt mixture according to the present disclosure includes the anti-stripping agent including the refined slowly-cooled slag, it can exhibit water resistance similar to or better than hydrated lime, and at the same time, can satisfy physical property conditions required for asphalt mixtures, for example, rutting, tensile strength, viscoelastic behavior and long-term pavement performance conditions. As a result, the use of the anti-stripping agent including the refined slowly-cooled slag, as a substitute for hydrated lime or a liquid anti-stripping agent, which is difficult to actually apply widely, can provide an asphalt mixture which can exhibit excellent effects in terms of water resistance, as well as other physical properties, and which is actually widely applicable in terms of economic efficiency and environmental friendliness.

Another embodiment of the present disclosure is directed to a method for preparing an asphalt mixture. The preparation method may include: preparing an anti-stripping agent for an asphalt mixture according to the above-described embodiment; adding the prepared anti-stripping agent to heated asphalt, followed by uniform mixing to obtain a mixture; and adding the mixture to heated aggregate, followed by mixing.

In one embodiment, the anti-stripping agent for the asphalt mixture may be added in an amount of 0.5 to 6.0 wt %, preferably 1.0 to 3.0 wt %, based on the weight of the aggregate. If the content of the anti-stripping agent for the asphalt mixture is less than 0.5 wt %, the adhesion between the asphalt and the aggregate cannot be sufficiently ensured, and thus the water resistance of the asphalt mixture can be reduced, and if the content of the anti-stripping agent for the asphalt mixture is more than 6.0 wt %, other physical properties of the asphalt mixture can be deteriorated.

In one embodiment, the weight between the asphalt and the aggregate may be in the range of 3.5:96.5 to 6.0:94.0.

Hereinafter, the present disclosure will be described in more detail with reference to examples. However, these examples are for illustrative purposes and the scope of the present disclosure is not limited by these examples.

EXAMPLES

1. Preparation and Evaluation of Anti-Stripping Agent for Asphalt Mixture Including Refined Slowly-Cooled Slag The raw material steelmaking slag was sized by a first reference diameter of 500 mm, and then sized by a second reference diameter of 20 mm. The slag greater than a diameter of 20 mm, separated by the second sizing process, was subjected to a magnetic separation process, and the non-attached material remaining after separating the ferrous material was crushed to a diameter equal to or smaller than 20 mm. The crushed non-attached material was combined with the slag equal to or smaller than a diameter of 20 mm, separated by the second sizing process, and the combined slag was subjected to magnetic separation and air classification processes. Next, the non-attached material remaining after separating the ferrous material was coated with water by supplying tap water or purified water at a rate of 3-5 kg per minute through a spray nozzle mounted in a kiln feed hopper. The water-coated non-attached material was introduced into a kiln in which it was subjected to a drying process at a temperature of about 350° C. The dried material was collected by a collection system, and then subjected to a quality equalization process using the air slide, thereby preparing a powdery anti-stripping agent for an asphalt mixture including refined slowly-cooled slag.

The composition of the prepared anti-stripping agent was measured by XRF analysis, and the results are shown in Table 1 below. In the composition shown in Table 1 below, each anti-stripping agent includes water and trace elements as the balance based on 100 mass %, which are not shown in Table 1 below. In addition, in Table 1 below, Comparative Example 1 denotes hydrated lime, Comparative Examples 2 to denote commercially available limestone powder, and Comparative Examples 5 and 6 denote commercially available recovered dust.

TABLE 1

| Composition | CaO | MgO | SiO$_2$ | Al$_2$O$_3$ | MnO | Na$_2$O | K$_2$O | P$_2$O$_5$ | TiO$_2$ |
|---|---|---|---|---|---|---|---|---|---|
| Example 1 | 62.49 | 1.77 | 7.06 | 1.19 | 0.31 | 0.06 | 0.08 | 0.12 | 0.14 |
| Example 2 | 64.31 | 1.77 | 6.91 | 1.15 | 0.27 | 0.03 | 0.06 | 0.11 | 0.09 |
| Example 3 | 63.87 | 2.08 | 7.53 | 1.26 | 0.29 | 0.02 | 0.07 | 0.13 | 0.14 |
| Example 4 | 63.31 | 1.48 | 8.04 | 0.80 | 0.29 | 0.04 | 0.08 | 0.12 | 0.14 |
| Example 5 | 62.15 | 1.43 | 7.17 | 1.18 | 0.31 | 0.06 | 0.10 | 0.11 | 0.13 |
| Example 6 | 61.43 | 1.53 | 7.45 | 1.18 | 0.20 | 0.02 | 0.08 | 0.13 | 0.14 |
| Example 7 | 64.52 | 1.42 | 8.05 | 1.08 | 0.35 | 0.04 | 0.08 | 0.14 | 0.16 |
| Example 8 | 60.62 | 1.43 | 6.89 | 1.02 | 0.41 | 0.03 | 0.09 | 0.11 | 0.15 |
| Example 9 | 63.43 | 1.45 | 7.69 | 1.00 | 0.39 | 0.04 | 0.08 | 0.13 | 0.16 |
| Example 10 | 61.83 | 1.59 | 7.04 | 1.15 | 0.37 | 0.01 | 0.08 | 0.14 | 0.15 |
| Example 11 | 58.38 | 1.53 | 6.20 | 1.34 | 0.44 | — | 0.07 | 0.13 | 0.16 |
| Example 12 | 59.90 | 1.70 | 6.93 | 1.24 | 0.33 | 0.02 | 0.08 | 0.12 | 0.12 |
| Example 13 | 62.50 | 1.90 | 6.99 | 1.16 | 0.27 | 0.07 | 0.07 | 0.11 | 0.12 |
| Example 14 | 64.40 | 2.31 | 7.16 | 1.04 | 0.25 | 0.04 | 0.07 | 0.11 | 0.12 |
| Comparative Example 1 | 75.78 | 3.61 | 1.23 | 0.59 | 0.05 | — | 0.12 | 0.01 | 0.16 |
| Comparative Example 2 | 46.29 | 1.27 | 13.01 | 9.25 | 0.02 | 0.05 | 3.29 | 0.01 | 0.25 |
| Comparative Example 3 | 62.27 | 1.47 | 7.78 | 2.96 | 0.12 | 0.09 | 0.92 | 0.07 | 0.26 |
| Comparative Example 4 | 74.78 | 0.43 | 1.09 | 0.40 | 0.02 | 0.02 | 0.07 | 0.01 | — |
| Comparative Example 5 | 3.41 | 3.30 | 43.87 | 15.73 | 0.14 | 1.64 | 4.46 | 0.19 | 1.04 |
| Comparative Example 6 | 17.84 | 2.29 | 36.80 | 10.83 | 0.13 | 1.60 | 3.14 | 0.15 | 0.61 |

Figure 1B:
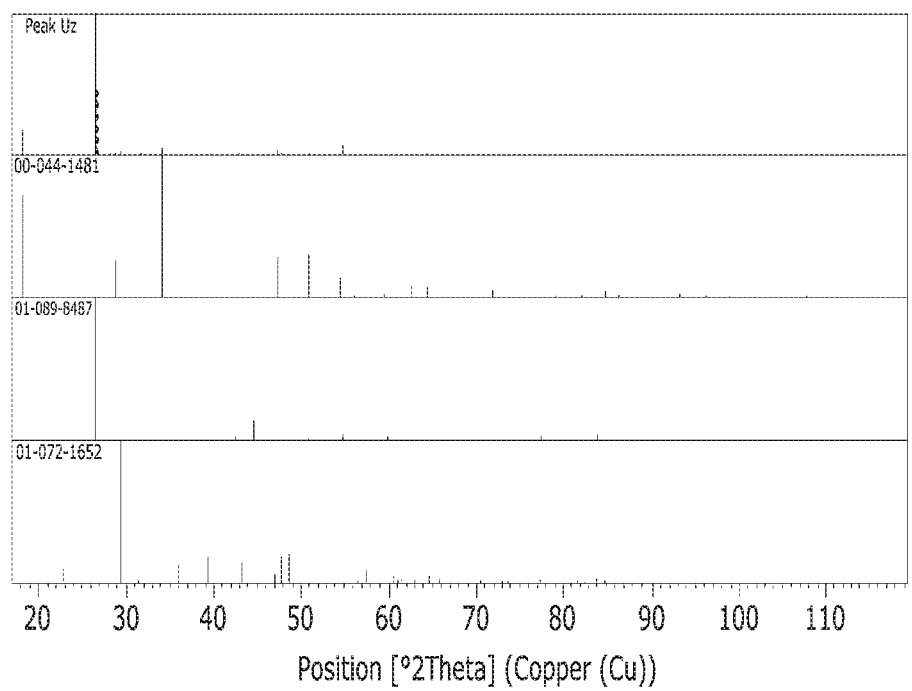
Figure 1C:
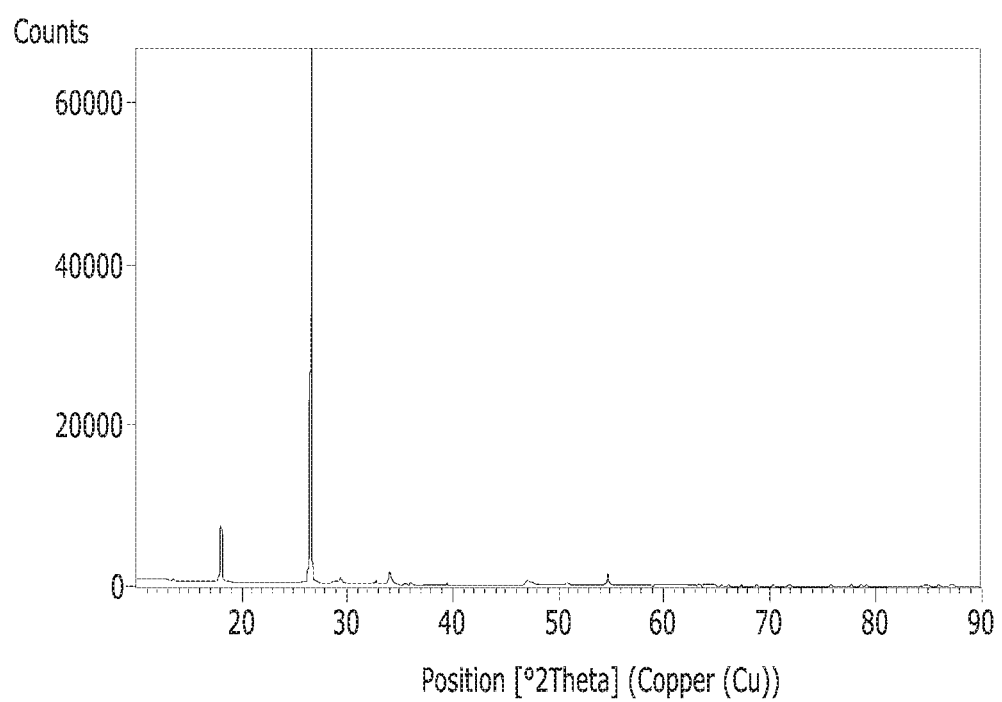
Figure 1D:
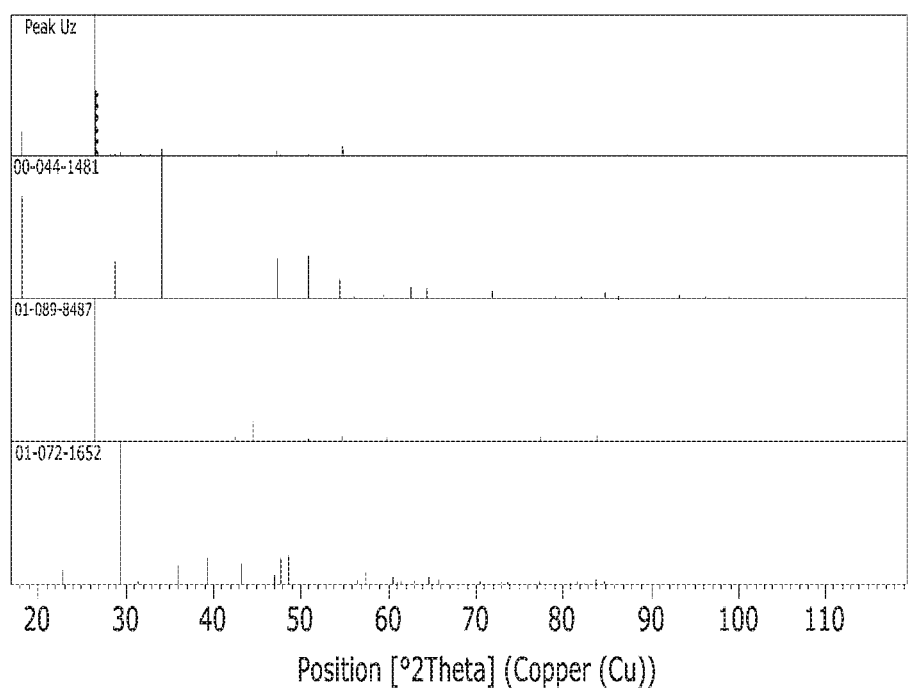

In addition, the microstructure of the prepared anti-stripping agent was analyzed by performing XRD analysis. The results of the analysis are shown in FIGS. 1A to 1D. FIGS. 1A and 1B, respectively, show the XRD analysis pattern and pattern list of the anti-stripping agent including the refined slowly-cooled slag according to the Example, and FIGS. 1C and 1D, respectively, show the XRD analysis pattern and pattern list of hydrated lime.

As shown in FIGS. 1A to 1D, the anti-stripping agent including the refined slowly-cooled slag according to the present disclosure showed an XRD analysis pattern similar to that of hydrated lime. This suggests that the anti-stripping agent including the refined slowly-cooled slag according to the present disclosure can precipitate a calcium ion on the aggregate surface of an asphalt mixture, similar to hydrated lime, in which the calcium ion can bind to an acid contained in the asphalt to form an insoluble salt, thereby improving the adhesion between the asphalt and the aggregate.

In addition, the anti-stripping agent including the refined slowly-cooled slag according to the present disclosure was tested according to KS F 3501 related to fillers for asphalt pavement. The test results indicated that the anti-stripping agent satisfied all the specified conditions. The results are shown in Table 2 below.

TABLE 2

| | Quality standards | Example 15 | Example 16 |
|---|---|---|---|
| Water content | 1.0% or less | 0.3% | 0.3% |
| Specific gravity | — | 2.420 g/cm$^3$ | 2.446 g/cm$^3$ |
| Plasticity index | 6 or less | NP (non-plastic) | NP (non-plastic) |
| Flow index | 50% or less | 33% | 33% |
| Swelling | 3% or less | 2.2% | 2.3% |
| Anti-stripping performance | ¼ or less | ¼ or less | ¼ or less |

| | Sieve size | Quality standard (% passage) | | |
|---|---|---|---|---|
| Particle size | 0.6 mm | 100 | 100% | 100% |
| | 0.3 mm | 95 or more | 98% | 100% |
| | 0.15 mm | 90 or more | 97% | 98% |
| | 0.08 mm | 70 or more | 88% | 78% |

As can be clearly seen from the above test results, the anti-stripping agent for an asphalt mixture, which includes the refined slowly-cooled slag according to the present disclosure, satisfies the physical properties required for asphalt pavement fillers. In particular, it can exhibit an effect similar to or better than hydrated lime in terms of water resistance, and thus can be economically and efficiently used widely in the industrial field as a substitute for hydrated lime or liquid anti-stripping agents, the actual applicability of which is very limited.

2. Preparation and Evaluation of Asphalt Mixture

The preparation and evaluation of performance of an asphalt mixture including the anti-stripping agent based on the refined slowly-cooled slag were simultaneously performed for an asphalt mixture prepared by a mix design in a laboratory and for an asphalt mixture produced on site in an actual asphalt plant. As shown in Table 3 below, test items include water-stripping resistance, rutting resistance, linear viscoelastic behavior characteristic, fatigue crack resistance, and the like. Test methods, related dynamic characteristics and test conditions are shown in Table 3 below.

TABLE 3

| | Test method | Dynamic characteristics | Test conditions |
|---|---|---|---|
| Dynamic immersion test | BS EN 12697-11(2003) | Visual evaluation of stripping (%) | 25° C., 60 rpm, 24 hrs |
| Indirect tensile strength ratio | AASHTO T 283 | Water damage resistance | Measurement of test sample treated with water at 60° C. and dried |
| Hamburg wheel tracking | AASHTO T 324(2011) | Stripping point, rut depth at 20,000 wheel passes | Performed in water at 50° C., 705N ± 4.5N |
| Dynamic modulus test | AASHTI TP 62 | Viscoelastic behavior characteristic, temperature-dependent evaluation of stiffness | Loading frequencies: 20, 10, 5, 1, 0.5, and 0.1 Hz; temperatures: 5, 20, 40 and 54° C. |
| Small-scale accelerated pavement testing (MMLS3) | — | Fatigue crack resistance, rutting, surface wear resistance, etc. | Wheel load: 2.7 kN; tire air pressure: 690-900 kPa |

The laboratory-prepared asphalt mixture sample used in the test was prepared based on the surface layer asphalt mixture WC-3(20) given in the Guidelines set by the Korean Ministry of Land, Infrastructure and Transport, and the mix design was performed based on the laboratory mix design procedures given in the Guidelines for Asphalt Concrete Pavement Construction set by the Korean Ministry of Land, Infrastructure and Transport. For the mix design, the Marshall mix design was performed considering the on-site conditions of South Korean asphalt plants, and an asphalt content having a porosity of 4% was determined to be an optimal asphalt content. The mix design of the asphalt mixture produced on site in the asphalt plant was performed using the aggregate and asphalt binder used in the asphalt plant, and the test sample was prepared. Based on the results of the mix design performed in the plant, the test sample was prepared.

(1) Dynamic Immersion Test

To evaluate the water resistance of the asphalt mixture containing the refined slowly-cooled slag, a dynamic immersion test was performed in the present disclosure. The dynamic immersion test is performed to evaluate the water susceptibility of uncompacted mixtures, and is a relatively simple test method described in the Guidelines for Asphalt Concrete Pavement Construction (2017) (set by the Korean Ministry of Land, Infrastructure and Transport) and also defined in EU BS EN126911.

The dynamic immersion test is performed on asphalt binder-coated aggregate to evaluate the adhesion between aggregate and the asphalt binder in a state in the asphalt mixture is immersed. In this test, aggregate, which passes through 11.2 mm and is smaller than 8 mm, is used. Specifically, aggregate that meets the standard is washed clean with water to remove fine powder remaining thereon, and is heated in an oven at 105±5° C. until there is no change in the weight, followed by cooling. Next, 510±2 g of the aggregate is completely coated by mixing with 16 g of an asphalt binder. The mixture is cured at room temperature for at least 16 hours, and then placed in a test container containing distilled water and is rolled at 60 rpm at a temperature of 20 to 25° C. for 24 hours, after which the coating of the asphalt binder on the aggregate is visually evaluated. The dynamic immersion test makes it possible to visually evaluate the stripping of the asphalt coated on the aggregate, even though it is difficult to achieve accurate quantitative evaluation. The Guidelines set by the Korean Ministry of Land, Infrastructure and Transport require that when the degree of visually evaluated stripping is 50% or more, hydrated lime or a liquid anti-stripping agent should be used.

The Guidelines for Asphalt Concrete Pavement Construction set by the Korean Ministry of Land, Infrastructure and Transport describe that the amount of hydrated lime used is 1.5 wt % based on the weight of aggregate. Thus, in the dynamic immersion test performed in the present disclosure, each of the refined slowly-cooled slag and hydrated lime was added to 510 g of aggregate in an amount of 1.5 wt % based on the weight of the aggregate, and the adhesion between the aggregate and the asphalt binder was compared between the addition of the refined slowly-cooled slag and the addition of the hydrated lime. In addition, as a control, 1.5 wt % of limestone powder was also added in the dynamic immersion test in order to compare the effect of fine powder with when other material was not added. The asphalt binder was PG 64-22 (AP-5) which is generally used in South Korea. The results of the dynamic immersion test are shown in FIGS. 2A to 2D.

Figure 2A:
FIGS. 2A to 2C shows the results of a dynamic immersion test for an asphalt mixture according to a comparative example.
Figure 2B:
Figure 2C:
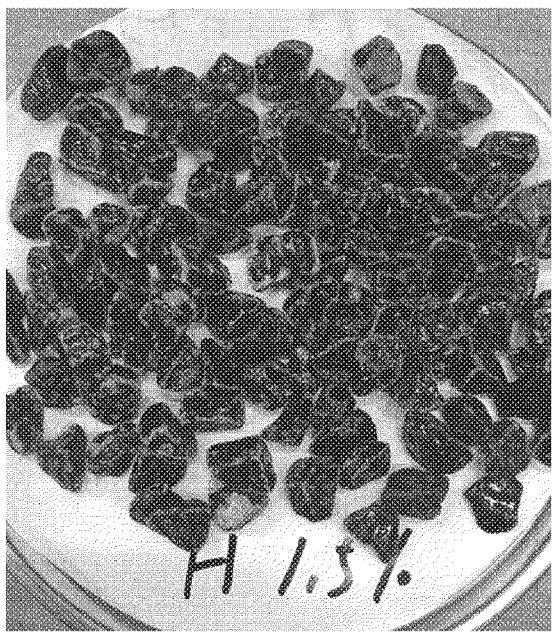

FIG. 2A shows a mixture containing only conventional AP-5 without containing other additive; FIG. 2B shows a mixture containing 1.5 wt % of limestone powder; FIG. 2C shows a mixture containing 1.5 wt % of hydrated lime; and FIG. 2D shows a mixture containing the anti-stripping agent based on the refined slowly-cooled slag according to the Example.

Figure 2D:
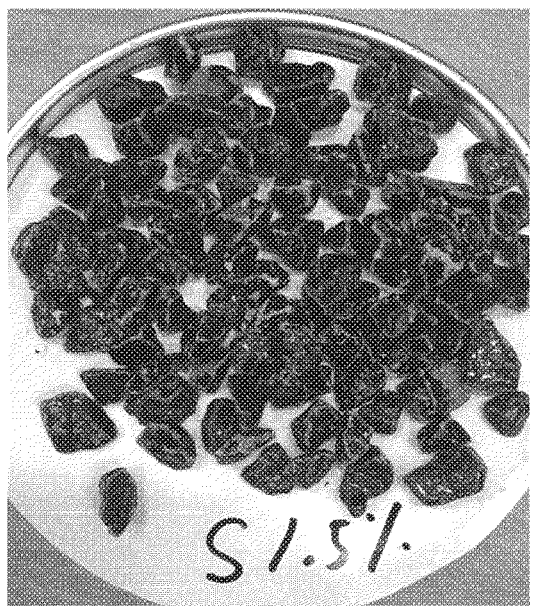
FIG. 2D shows the results of a dynamic immersion test for an asphalt mixture according to an example.

As shown in FIG. 2D, in the case of the asphalt mixture containing the anti-stripping agent based on the refined slowly-cooled slag, it can be visually seen that the asphalt binder mostly remains on the aggregate. This result indicates that about 80% or more of the binder was coated well on the aggregate, similar to when 1.5 wt % of hydrated lime was added as shown in FIG. 2C. On the contrary, in the case of the asphalt mixture containing only conventional AP-5 as shown in FIG. 2A, it can be visually seen that the amount of asphalt binder coated was 20% or less, suggesting that most of the asphalt binder was stripped from the aggregate. In addition, in the case of the asphalt mixture containing 1.5 wt % of limestone powder as shown in FIG. 2B, the coverage rate was about 20% after the test. This is believed to be because the limestone powder was attached to the aggregate by absorbing a portion of the asphalt.

The results of the dynamic immersion test indicate that the use of the refined slowly-cooled slag according to the present disclosure in the asphalt mixture can improve the water resistance of the asphalt mixture to a level achieved by hydrated lime.

(2) Indirect Tensile Strength Ratio Test

Indirect tensile strength ratio test was performed on samples prepared in a laboratory and samples prepared on site in an asphalt plant, in accordance with the AASHTO T 283 standards which are internationally widely used. The laboratory-prepared samples were prepared by adding 1 wt %, 1.5 wt %, 2 wt % and 3 wt % of the refined slowly-cooled slag instead of limestone powder as a filler, and the samples prepared in the plant contained 0 wt %, 1 wt %, 2 wt % and 3 wt % of the refined slowly-cooled slag according to the Example instead of recovered dust and limestone powder. The laboratory-prepared samples were prepared using the combined gradation and optimal asphalt content determined based on the results of the laboratory mix design, and the samples prepared on site in the asphalt plant were prepared based on the results of the mix design used on site in the asphalt plant. For asphalt mixtures for the indirect tensile strength ratio test, compacted test samples were prepared by performing compaction to a porosity of 7±0.5% in view of the situation of South Korean asphalt plants by using the Marshall compactor without using the gyratory compactor. The indirect tensile strength test was performed on three test samples in a dry state and performed on the remaining three test samples after vacuum processing and water treatment, respectively. The test samples for drying testing were cured at room temperature until the test, sealed with a foil or the like, placed in plastic sample boxes, cured in a constant-temperature water bath at 25° C. for up to 2 hours, and then subjected to the indirect tensile strength test. The remaining three test samples were processed under vacuum, and then cured in a constant-temperature water bath at a temperature of 60±1° C. for 24±1 hours, after which the samples were taken out and placed in a water bath at 25±1° C. for 2±0.5 hours, and then subjected to the indirect tensile strength test.

Tensile strength ratio (TSR) is calculated according to the following equation using the tensile strength values measured in a dry state and a wet state:

$$TSR\ (\%) = \frac{S_1}{S_0} \times 100$$

wherein
$S_0$=the indirect tensile strength of a reference test sample in a dry state;
$S_1$=the indirect tensile strength of a test sample treated in a wet state.

The resistance to moisture damage of the asphalt mixture is considered to be better when the TSR value is larger.

Figure 3A:
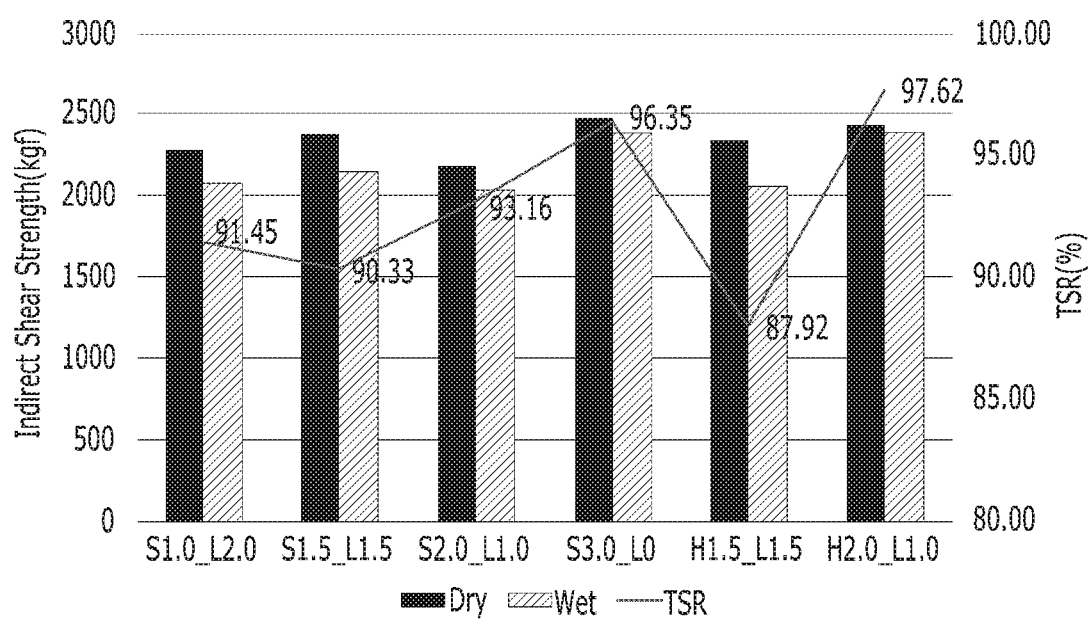
FIG. 3A shows the results of an indirect tensile strength test for samples having various contents of a refined slowly-cooled slag, prepared in a laboratory.
Figure 3B:
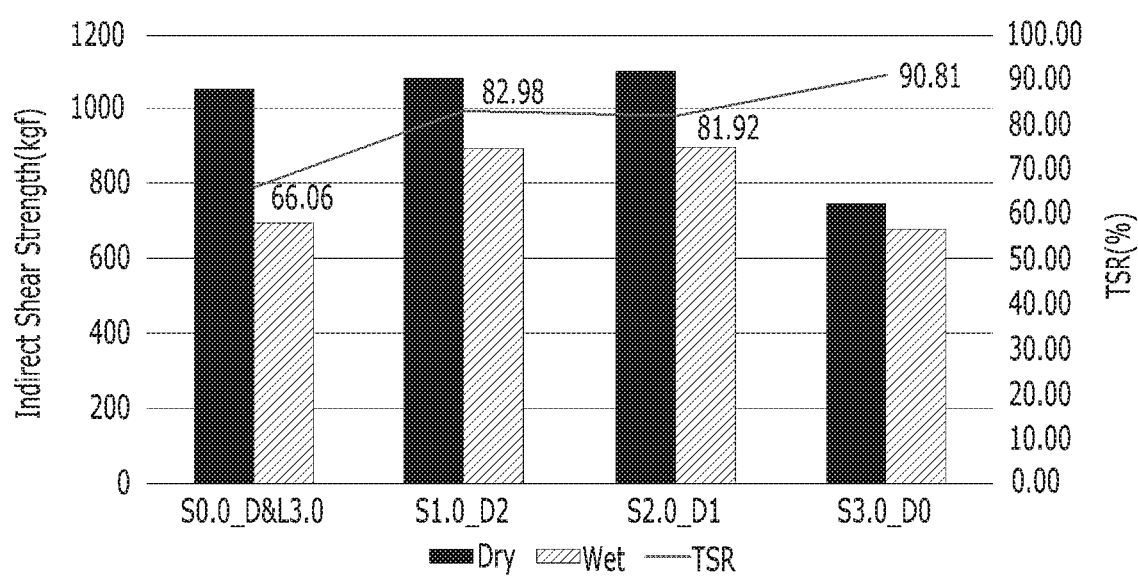
FIG. 3B shows the results of an indirect tensile strength test for samples having various contents of a refined slowly-cooled slag, prepared on site in an asphalt plant field.

FIG. 3A shows the results of the indirect tensile strength test for the laboratory-prepared samples having various contents of the refined slowly-cooled slag, and FIG. 3B shows the results of an indirect tensile strength test for samples having various contents of a refined slowly-cooled slag, prepared on site in the asphalt plant. In FIGS. 3A and 3B, "S" represents the refined slowly-cooled slag in accordance with an embodiment of the present invention, "L" represents limestone powder, "H" represents "hydrated lime" and in FIG. 3B, "D" represents recovered dust. Further, in FIGS. 3A and 3B, the numbers which are described together with "S", "L", "H" and "D" indicates the amount (wt %) of the respective elements. For example, "S1.0_L2.0" indicates that 1.0 wt % of the refined slowly-cooled slag and 2.0 wt % of the limestone powder are contained in the sample.

As shown in FIG. 3A, the results of the indirect tensile strength test for the laboratory-prepared samples indicated that the indirect tensile strength ratio showed a tendency to increase as the content of the refined slowly-cooled slag (S) according to the Example increased. This is believed to be because the slowly-cooled slag replaced limestone powder (L) used in the asphalt mixture, and thus generated a large amount of an insoluble salt precipitate through a chemical reaction, like hydrated lime (H), thereby improving the adhesion between the aggregate and the asphalt binder. Meanwhile, it was shown that all the test sample hydrated lime and the test sample containing the slowly-cooled slag satisfied all the quality standards for indirect tensile strength ratio described in the Guidelines for Asphalt Concrete Pavement Construction set by the Korean Ministry of Land, Infrastructure and Transport.

In addition, as shown in FIG. 3B, the results of the indirect tensile strength test for the test samples prepared on site in the asphalt plant indicated that the indirect tensile strength ratio showed a tendency to increase as the content of the refined slowly-refined slag (S) according to the Example increased. This suggests that the refined slowly-refined slag (S) according to the Example contributes to improving water resistance both in a laboratory and on site. It was analyzed that the three test samples containing the refined slowly-cooled slag (S) all satisfied the quality standards set by the Korean Ministry of Land, Infrastructure and Transport, but the test sample (indicated by S0.0_D&L3.0 in FIG. 3B) containing recovered dust (D) and limestone powder (L) as a filler at a ratio of 30:70 in an amount of 3 wt % based on the weight of aggregate used without containing the refined slowly-cooled slag (S) did not satisfy the quality standards set by the Korean Ministry of Land, Infrastructure and Transport.

(3) Hamburg Wheel Tracking Test

The Hamburg wheel tracking test is a test capable of determining simultaneously both rutting and water susceptibility, and is described in AASHTO T 324. It is a test method in which compacted samples are immersed in hot water at 50° C. and a wheel load of 705±4.5 N is repeatedly loaded and the rut depth is measured every time. Generally, the US Department of Transportation requires the use of asphalt mixtures which show a stripping point after at least 10,000 wheel passes under 20,000 wheel passes and show a rut depth of not more than 20 mm at 20,000 wheel passes. For water susceptibility, the point at which the rut depth slope changes rapidly in the Hamburg wheel tracking test is defined as the stripping point, and an asphalt mixture showing a stripping point that appears later is evaluated as an asphalt mixture having better water susceptibility.

For laboratory-prepared samples, the test was performed for two cases in which the contents of a filler were 3 wt % and 2 wt % based on the weight of an asphalt mixture. For testing for the case in which the content of the filler was 3 wt %, test samples were prepared using 1 wt %, 2 wt % and 3 wt % of the refined slowly-cooled slag (S) instead of the filler limestone powder (L). As a control, a test sample having the maximum hydrated lime (H) content of 1.5 wt % as specified by the Korean Ministry of Land, Infrastructure and Transport, was prepared and tested. In addition, for testing for the case in which the content of the filler was 2 wt %, test samples containing each of the refined slowly-refined slag (S) and hydrated lime (H) in an amount of 1 wt % were prepared.

Figure 4A:
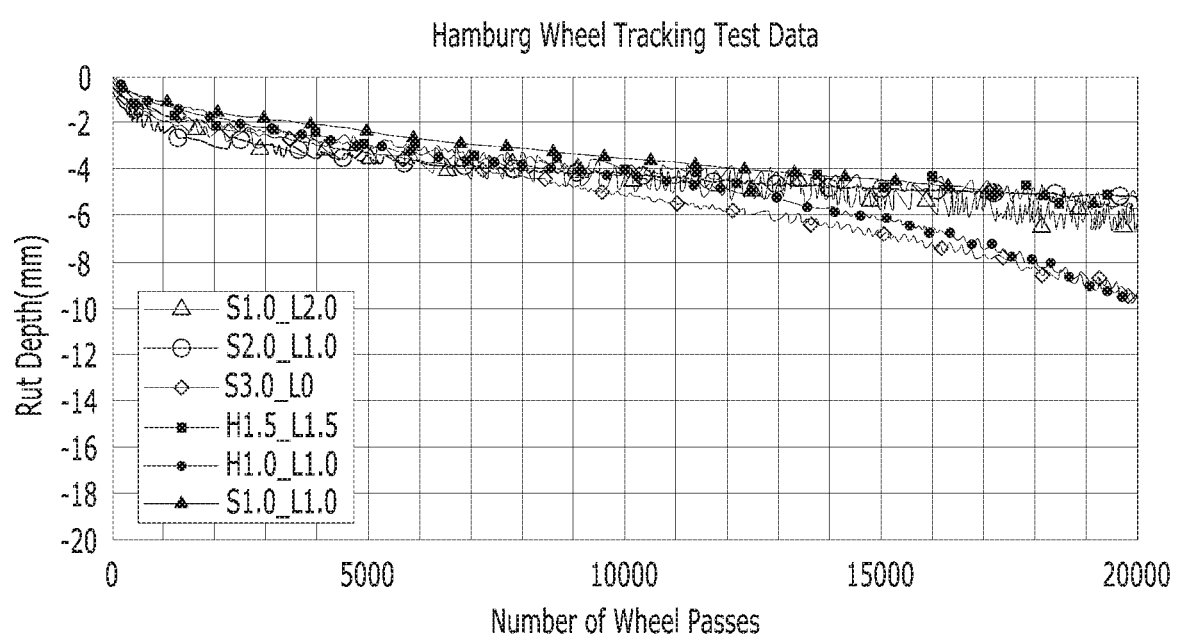
FIGS. 4A and 4B, respectively, show the results of a Hamburg wheel tracking test for samples prepared in a laboratory, and the surface appearances of the test samples after the Hamburg wheel tracking test, and FIGS. 4C and 4D, respectively, show the results of a Hamburg wheel tracking test for samples prepared on site in an asphalt plant and the surface appearances of the test samples after the Hamburg wheel tracking test.
Figure 4B:
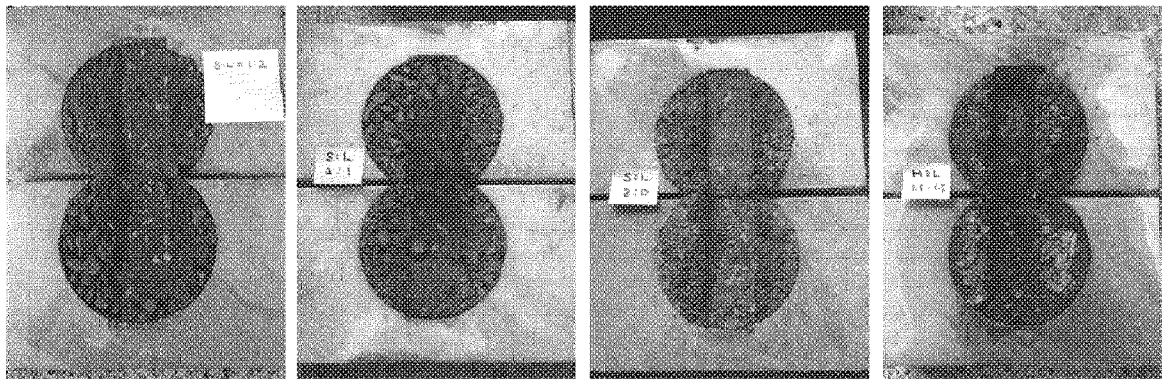
Figure 4C:
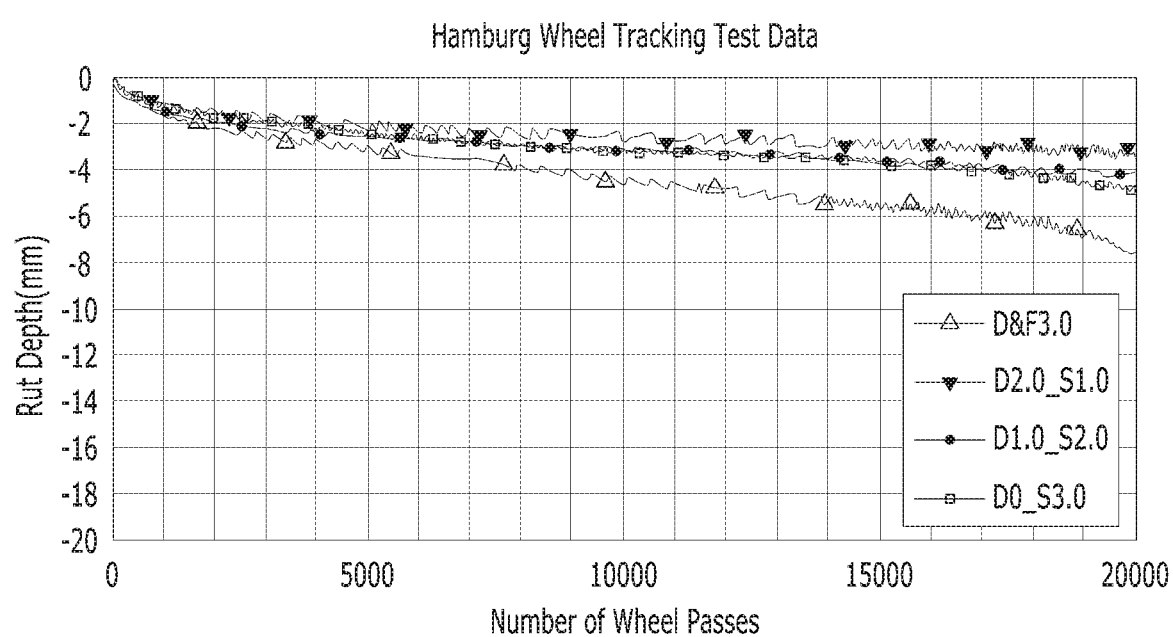
Figure 4D:

FIGS. 4A and 4B, respectively, show the results of the Hamburg wheel tracking test for the laboratory-prepared samples, and the surface appearances of the test samples after the Hamburg wheel tracking test, and FIGS. 4C and 4D, respectively, show the results of a Hamburg wheel tracking test for samples prepared on site in an asphalt plant and the surface appearances of the test samples after the Hamburg wheel tracking test. In FIGS. 4A to 4D, represents the refined slowly-cooled slag in accordance with an embodiment of the present invention, "L" represents limestone powder, "H" represents "hydrated lime" and in FIG. 4C, "D" represents recovered dust. Further, in FIGS. 4A and 4C, the numbers which are described together with "S", and "D" indicates the amount (wt %) of the respective elements. For example, "S1.0_L2.0" indicates that 1.0 wt % of the refined slowly-cooled slag and 2.0 wt % of the limestone powder are contained in the sample.

As shown in FIG. 4A, the results of the Hamburg wheel tracking test for the laboratory-prepared samples indicated that the samples all showed a rut depth of 5 to 10 mm after 20,000 wheel passes, which satisfies the standard of 20 mm specified by the US Department of Transportation. The test sample having a hydrated lime content of 1.5 wt %, used as the control, showed a rut depth of 5.87 mm, which was similar to that of the sample containing 1 wt % of the slowly-cooled slag. In the case in which the content of the filler was 2 wt %, the test sample containing 1 wt % of the refined slowly-cooled slag (S) showed a rut depth of 5.70 mm at 20,000 wheel passes, and the test sample containing 1 wt % of hydrated lime (H) showed a rut depth of 9.45 mm, indicating that the rutting resistance of the test sample containing 1 wt % of the refined slowly-cooled slag (S) was somewhat better than that of the test sample containing hydrated lime (H).

In addition, as shown in FIG. 4B that show the surface appearances of the test samples after the Hamburg wheel tracking test, the stripping of the test sample surfaces was hardly visible to the naked eye. This indicates that the refined slowly-cooled slag (S) and hydrated lime (H), when applied to asphalt mixtures, all improve the stripping resistance of the asphalt mixtures.

Meanwhile, for the test samples prepared on site in the asphalt plant, the Hamburg wheel tracking test was performed using recovered dust (D) and the refined slowly-cooled slag (S). As shown in FIG. 4C, the results of the Hamburg wheel tracking test for the test samples prepared on site in the asphalt plant all showed a rut depth of 5 to 10 mm at 20,000 wheel passes, which satisfies the standard of 20 mm specified by the US Department of Transportation. In addition, in the case of the test sample (indicated by D&F 3.0 in FIG. 4C) not containing the refined slowly-cooled slag (S), it can be seen that the largest rutting occurred.

In addition, as shown in FIG. 4D that show the surface appearances of the test samples after the Hamburg wheel tracking test, in the test sample (indicated by 0% in FIG. 4D) not containing the refined slowly-cooled slag (S), it was observed that some stripping of the surface occurred after the test, whereas in the test sample containing the refined slowly-cooled slag (S), it could be observed that no stripping occurred. This suggests that the refined slowly-cooled slag (S) visibly improved the adhesion between the aggregate and the asphalt binder in the asphalt mixture.

(4) Evaluation of Linear Viscoelastic Behavior Characteristic

To evaluate the linear viscoelastic behavior characteristic of asphalt mixtures, a dynamic modulus test was performed. The test was performed according to standard AASHTO TP 62 at loading frequencies of 20, 10, 5, 1, 0.5 and 0.1 Hz and temperatures of 5, 20, 40 and 54° C. The loading level was adjusted such that the total strain would be 50 to 75 μs.

Figure 5A:
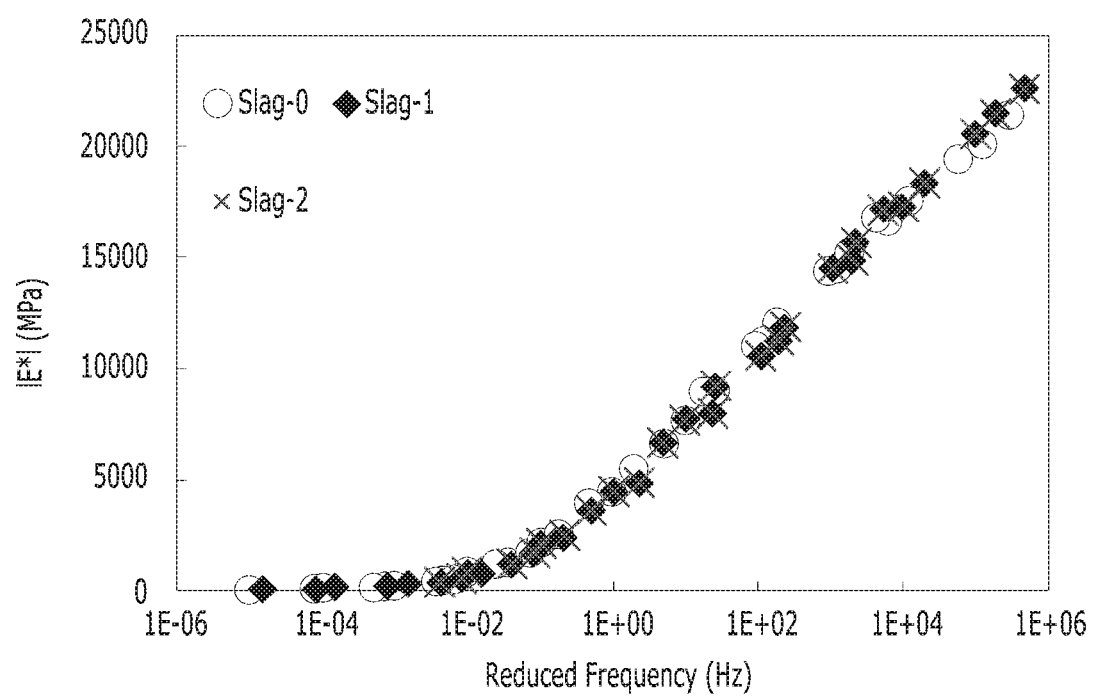
FIGS. 5A and 5B show the results of a dynamic modulus test in a low-temperature region and in a high-temperature region for asphalt mixtures.
Figure 5B:
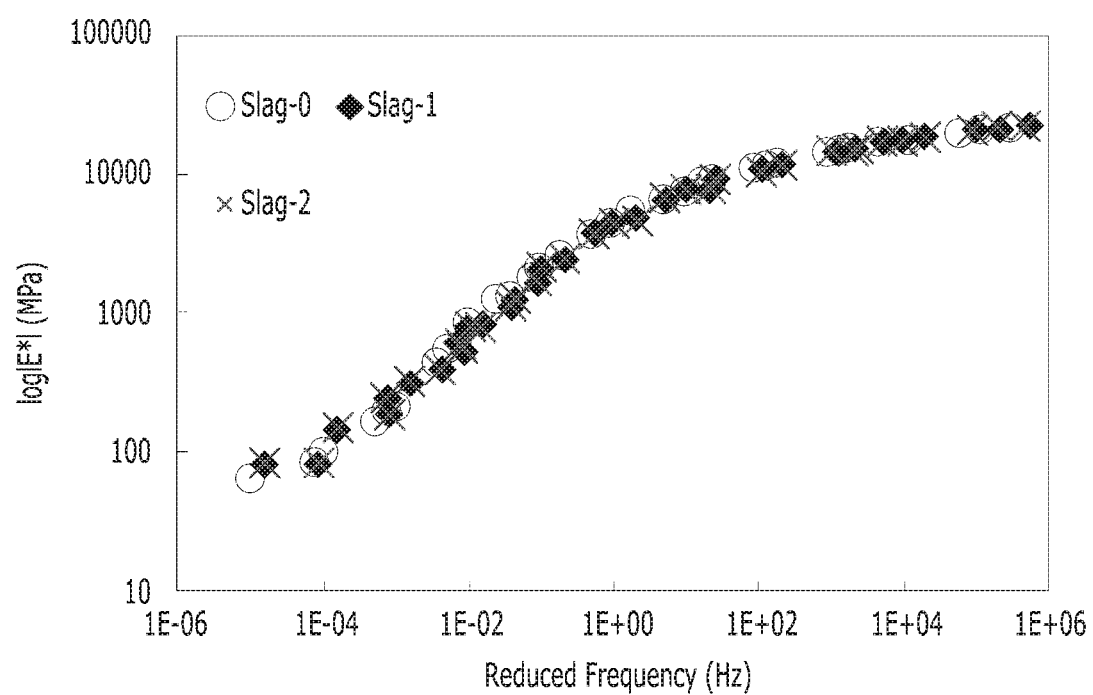

FIGS. 5A and 5B show the results of a dynamic modulus test in a low-temperature region and in a high-temperature region for asphalt mixtures, respectively. FIGS. 5A and 5B show dynamic modulus master curves at high temperature and low temperature according to the content of the slowly-cooled slag at a reference temperature of 5° C. Generally, a mixture, which shows a lower stiffness at a higher loading frequency (or lower temperature) and has a higher stiffness at a lower loading frequency (or higher temperature), is evaluated as a mixture having excellent rutting resistance and crack resistance. As shown in FIGS. 5A and 5B, the temperature-dependent changes in dynamic moduli of an asphalt mixture having a refined slowly-cooled slag content of 0% (Slag-0) and asphalt mixtures having refined slowly-cooled slag contents of 1% and 2% (Slag-1 and Slag-2) showed no great difference, regardless of the magnitude of loading frequency. This suggests that even when the refined slowly-cooled slag is added to an asphalt mixture, it does not change the viscoelastic behavior characteristic of the asphalt mixture, and that the refined slowly-cooled slag may be used for asphalt concrete since it does not change the dynamical behavior characteristic of asphalt concrete pavement.

(5) Small-Scale Accelerated Pavement Testing (Model Mobile Load Simulator)

MMLS3 is a device that may be used both on site and in a laboratory. It is a one-third scale of a full-scale asphalt pavement testing device designed such that it can simulate a unidirectional vehicle load. Small-scale accelerated pavement testing can evaluate pavement performance at various temperatures by applying traffic loads after installing the MMLS3 in a temperature-controllable environmental chamber. Although asphalt pavement performance testing using the MMLS3 has not yet been standardized, many studies have been conducted globally using the MMLS3 device. This is because the use of the MMLS3 makes it possible to evaluate pavement performance characteristics, including fatigue cracking, rutting, surface wear resistance, fiber-reinforced overlay pavement performance, field pavement performance, and the like.

In this test, asphalt mixture slabs containing the refined slowly-cooled slag in varying amounts were prepared to have a size of 30×30×10 cm. In the test, water was continuously injected into the test samples, and the degree of stripping of the test samples in the water was evaluated. The results of the evaluation are shown in FIG. 6.

Figure 6:
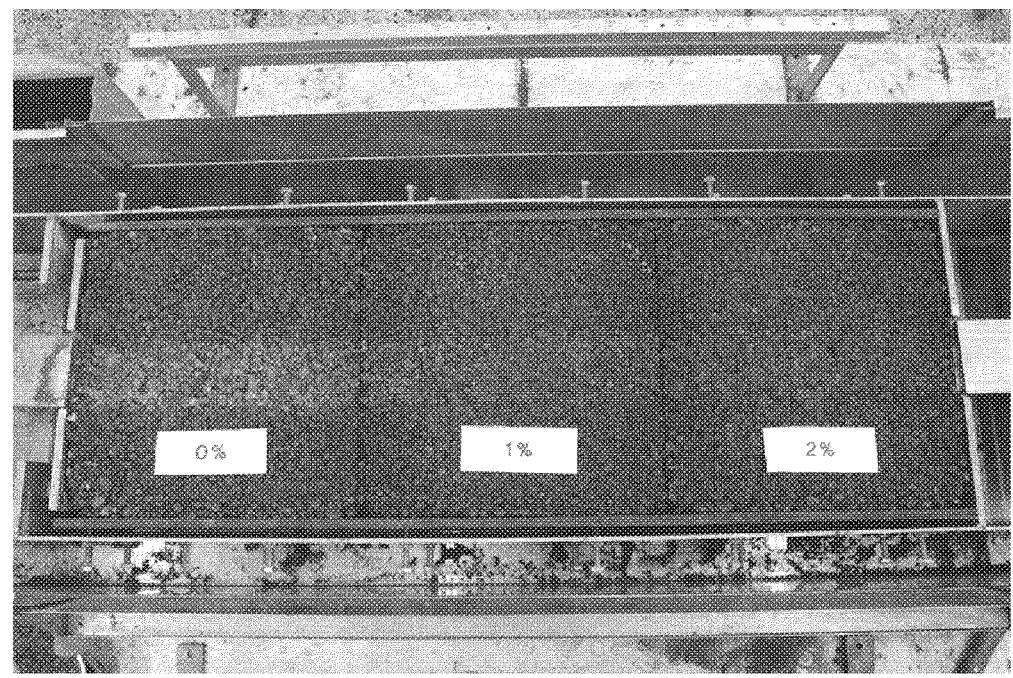
FIG. 6 shows the results of small-scale accelerated pavement testing performed at various contents of a refined slowly-cooled slag.
Figure 6:
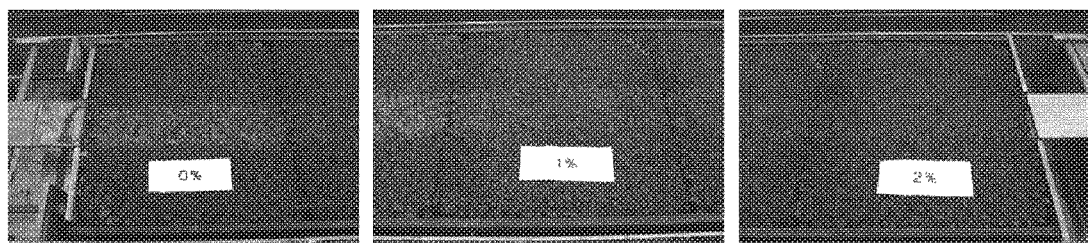

As shown in FIG. 6, in the case of conventional asphalt (indicated by 0% in FIG. 6) not containing the refined slowly-cooled slag, it could be observed that stripping of the asphalt pavement surface visibly occurred after 80,000 MMLS3 load applications. In addition, it could be seen that the degree of stripping that occurred decreased as the content of the refined slowly-cooled slag increased.

From the above evaluation results, it can be confirmed that the anti-stripping agent for the asphalt mixture, which includes the refined slowly-cooled slag according to the present disclosure, can exhibit water resistance when applied to asphalt mixtures, similar to hydrated lime, because it includes a composition adjusted by a specific process so as to exhibit water resistance. In addition, it can be confirmed that the anti-stripping agent can satisfy other physical properties required for asphalt mixtures, for example, rutting resistance, tensile strength, road pavement performance, and the like. Accordingly, the anti-stripping agent for the asphalt mixture, which includes the refined slowly-cooled slag, may be applied to an asphalt mixture without reducing the pavement performance of the asphalt mixture at high temperatures and low temperatures, and can increase economic efficiency and environmental friendliness while exhibiting excellent physical properties, including water resistance.

As described above, according to the present disclosure, iron and steel slag, a by-product generated in ironmaking and steelmaking processes, may be processed by a specific method, so that it may be used as an anti-stripping agent for an asphalt mixture in order to improve the water resistance of the asphalt mixture.

The anti-stripping agent according to the present disclosure can exhibit a water-resistant effect equal to or better than conventional hydrated lime or liquid anti-stripping agents, and at the same time, can also exhibit high efficiency in economic terms, such as production equipment and costs.

Furthermore, the anti-stripping agent according to the present disclosure has the effect of minimizing the water susceptibility of the asphalt mixture by reducing the stripping of asphalt from aggregate, as well as the effect of reducing aging by reducing the oxidation of an asphalt binder. Further, it can reduce the rutting of asphalt by increasing the stiffness of asphalt. It also provides effective crack resistance, and thus can reduce the progression of microcracks.

In addition, according to the present disclosure, the effects of saving energy, reducing environmental hazard and improving environment friendliness can be simultaneously obtained by recycling iron and steel slag, a by-product inevitably generated in the steelmaking industry.

While various embodiments have been described above, it will be understood to those skilled in the art that the embodiments described are by way of example only. Accordingly, the disclosure described herein should not be limited based on the described embodiments.

What is claimed is:

1. An anti-stripping agent for an asphalt mixture comprising a refined iron and steel slag, wherein the refined iron and steel slag comprises 55 to 65 mass % of CaO, 5 to 10 mass % of $SiO_2$, 1 to 5 mass % of $Al_2O_3$, and 1 to 5 mass % of MgO,
   wherein the anti-stripping agent has a water content of from 0.4 to 0.6 wt % uniformly distributed throughout,
   wherein the refined iron and steel slag is in the form of a powder of particles of less than 70 mm in diameter, and
   wherein the anti-stripping agent exhibits plasticity index of 6 or less, flow index 50% or less, swelling 3% or less, and anti-stripping performance of ¼ or less.

2. The anti-stripping agent of claim 1,
   wherein the refined iron and steel slag further comprises one or more selected from the group consisting of MnO, $Na_2O$, $K_2O$, $P_2O_5$ and $TiO_2$ in an amount of 0.001 to 0.5 mass %.

3. The anti-stripping agent of claim 1, wherein the refined iron and steel slag is obtained by processing iron and steel slag so as to remove any ferrous material and increase the collection and recovery of a nonferrous material comprising CaO, $SiO_2$, $Al_2O_3$ and MgO.

4. The anti-stripping agent of claim 1,
   wherein the refined iron and steel slag further comprises MnO, $Na_2O$, $K_2O$, $P_2O_5$ and $TiO_2$ each in an amount of 0.001 to 0.5 mass % and is substantially free of any ferrous material,
   wherein the powder of particles has a particle distribution as follows:

| Particle size | Sieve size | Quality standard (% passage) |
| --- | --- | --- |
| | 0.6 mm | 100 |
| | 0.3 mm | 95 or more |
| | 0.15 mm | 90 or more |
| | 0.08 mm | 70 or more | and
   wherein the refined iron and steel slag precipitates a calcium ion on a surface of aggregate in the asphalt mixture, and the precipitated calcium ion binds to an acid contained in asphalt to form an insoluble salt, thereby improving adhesion between the asphalt and the aggregate.

5. An asphalt mixture comprising: an anti-stripping agent for an asphalt mixture according to claim 1; aggregate; and asphalt.

6. The asphalt mixture of claim 5, wherein the anti-stripping agent is contained in an amount of 0.5 to 6.0 wt % based on the weight of the aggregate.

7. The asphalt mixture of claim 5, wherein a weight ratio between the asphalt and the aggregate is in the range of 3.5:96.5 to 6.0:94.0.

* * * * *